(12) United States Patent
Lyu et al.

(10) Patent No.: US 8,368,872 B1
(45) Date of Patent: Feb. 5, 2013

(54) METHOD FOR DETERMINING PLANTING BALL NUMBER OF CAMERA MODULE

(75) Inventors: Szu-Hao Lyu, Taipei (TW); Chien-Nan Yu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 13/279,496

(22) Filed: Oct. 24, 2011

(30) Foreign Application Priority Data

Jul. 15, 2011 (TW) .............................. 100125114 A

(51) Int. Cl.
*G01C 3/00* (2006.01)
(52) U.S. Cl. .......................................................... 356/3
(58) Field of Classification Search .................. None
See application file for complete search history.

(56) References Cited

U.S. PATENT DOCUMENTS 5,574,801 A * 11/1996 Collet-Beillon .............. 382/150
5,870,489 A * 2/1999 Yamazaki et al. ............. 382/151

* cited by examiner

*Primary Examiner* — Tu Nguyen
(74) *Attorney, Agent, or Firm* — Kirton McConkie; Evan R. Witt

(57) ABSTRACT

A method for determining the planting ball number of a camera module is provided. The camera module includes a substrate and a chip. The substrate includes an opening and a plurality of contact pads. The opening of the substrate has four rims. The method includes the following steps. Firstly, an image pickup device is used to detect an average contact pad distance of the distances from four specified contact pads of the substrate to the image pickup device. Then, a smallest opening distance among four opening distances from the four rims to the image pickup device is acquired. Then, plural actual contact pad distances from all contact pads to the image pickup device are acquired. The planting ball number for each contact pad is calculated according to these distances. Consequently, the quality of assembling the camera module is enhanced.

5 Claims, 5 Drawing Sheets

METHOD FOR DETERMINING PLANTING BALL NUMBER OF CAMERA MODULE

FIELD OF THE INVENTION

The present invention relates to a method for determining the planting ball number, and more particularly to a method for determining the planting ball number of a camera module.

BACKGROUND OF THE INVENTION

FIG. 1 schematically illustrates a conventional camera module. As shown in FIG. 1, the camera module 10 is assembled by a flip-chip packaging technology. The camera module 10 comprises a substrate 11 and a chip 12. The substrate 11 has a contact pad 111 and an opening 112. The chip 12 has a sensing region 121 and a connection region 122. A conductive bump 13 is disposed on the connection region 122. Through the conductive bump 13, the contact pad 111 and the connection region 122 are electrically connected with each other, and the substrate 11 and the chip 12 are combined together.

Please refer to FIG. 1 again. The contact pad 111 is disposed around the opening 112 and aligned with the connection region 122. The opening 112 is formed by using a hole-breaking component (not shown) to punch the substrate 11. However, after the hole-breaking component is withdrawn from the substrate 11, the edge of the opening 112 is readily subject to deformation in response to the stress. Under this circumstance, an upturned edge 113 is created at an edge of the opening 112.

During the substrate 11 and the chip 12 are laminated together by the flip-chip packaging technology, the upturned edge 113 may result in some drawbacks. For example, since the upturned edge 113 is protruded upwardly, the gap distance between the substrate 11 and the chip 12 is increased. Moreover, since the contacting point between the upturned edge 113 and the chip 12 acts like a fulcrum, a torque is readily generated to cause damage of the conductive bump 13. Under this circumstance, the adhesion instability between the substrate 11 and the chip 12 is largely increased.

FIG. 2 schematically illustrates another conventional camera module. For eliminating the adverse effect of the height of the upturned edge 113, a plurality of conductive bumps 13 are placed on the same connection region 122. In such way, the possibility of allowing the contacting point between the upturned edge 113 and the chip 12 to be formed as a fulcrum will be minimized. However, since the heights of the contact pads 111 corresponding to different connection regions 122 are not always identical, some drawbacks occur. For example, if the same number of conductive bumps 13 are placed on all of the connection regions 122, unnecessary packaging cost is increased. In addition, the uneven heights of the contact pads 111 may result in skew of the chip 12.

SUMMARY OF THE INVENTION

The present invention relates to a method for determining the planting ball number of a camera module, thereby enhancing the quality of packaging the camera module.

In accordance with an aspect of the present invention, there is provided a method for determining a planting ball number of a camera module. The camera module includes a chip and a substrate. The substrate has an opening with four rims. The chip is fixed on a plurality of contact pads of the substrate through a plurality of planting balls. Each of the planting balls has a ball height. The method is configured for determining a number of planting balls on each contact pad and includes the following steps. In the step (A), an image pickup device is allowed to focus on at least four specified contact pads of the substrate to acquire four specified contact pad distances from the at least four specified contact pads to the image pickup device, and the four specified contact pad distances are averaged to acquire an average contact pad distance. In the step (B), the image pickup device is allowed to focus on the four rims of the opening of the substrate to acquire four opening distances from the four rims to the image pickup device, and a smallest opening distance among the four opening distances is acquired. In the step (C), the image pickup device is allowed to focus on each contact pads of the substrate to acquire an actual contact pad distance from each contact pad to the image pickup device, thereby obtaining a plurality of actual contact pad distances. Then, the step (D) is performed to successively judge whether the actual contact pad distance is greater than the average contact pad distance. If the actual contact pad distance is greater than the average contact pad distance, a first difference value between the actual contact pad distance and the smallest opening distance is calculated, and the first difference value is divided by the ball height to acquire the planting ball number for the contact pad corresponding to the actual contact pad distance. Whereas, if the actual contact pad distance is not greater than the average contact pad distance, a second difference value between the average contact pad distance and the smallest opening distance is calculated, and the second difference value is divided by the ball height to acquire the planting ball number for the contact pad corresponding to the actual contact pad distance.

In an embodiment, the at least four specified contact pads are located at four corner of the substrate, respectively.

In an embodiment, the at least four specified contact pads are located at four predetermined coordinate positions, respectively.

In an embodiment, in the step (B), the image pickup device focuses on respective midpoint coordinate positions of the four rims, wherein each of the midpoint coordinate position is located at a midpoint of the corresponding rim.

In an embodiment, the image pickup device includes a contrast autofocus unit.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
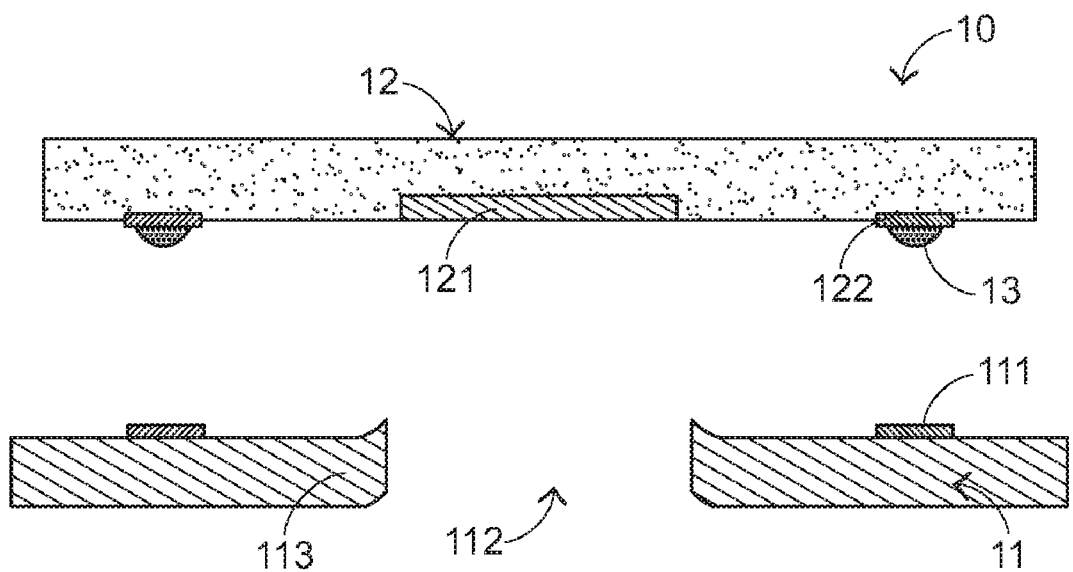
FIG. 1 schematically illustrates a conventional camera module.
Figure 2:
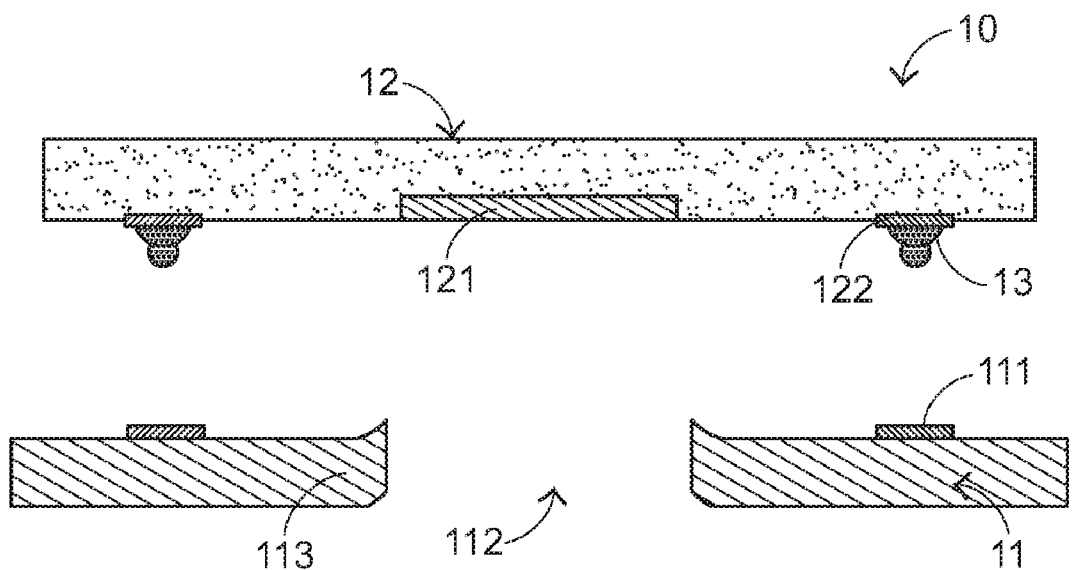
FIG. 2 schematically illustrates another conventional camera module.
Figure 3:
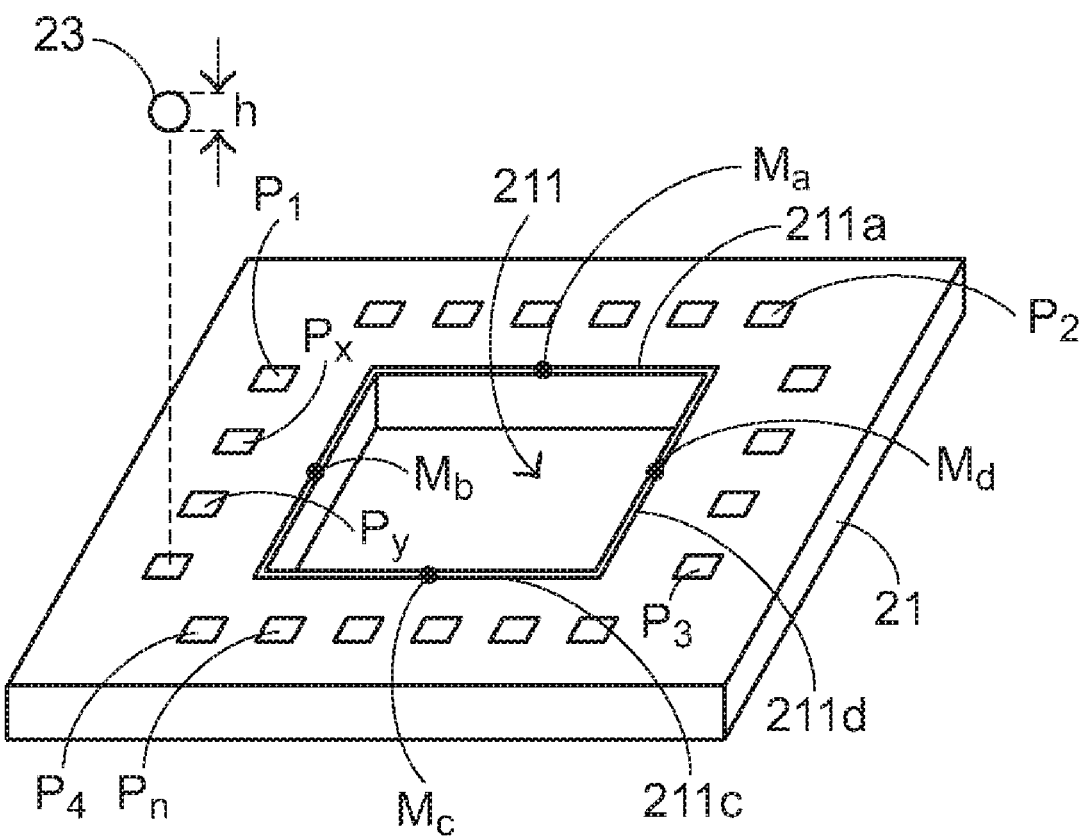
FIG. 3 schematically illustrates a camera module according to an embodiment of the present invention.

FIG. 3 schematically illustrates a camera module according to an embodiment of the present invention. As shown in FIG. 3, the camera module 20 comprises a substrate 21 and a chip 22. The substrate 21 has an opening 211 and a plurality of contact pads $P_n$, wherein n=1~n, and n is a positive integer. The opening 211 has four rims 211a, 211b, 211c and 211d. Each of the contact pads $P_n$ is used for supporting at least one conductive bump. For example, the conductive bump is a planting ball 23, which is made of conductive metallic material. Through the planting ball 23, the substrate 21 and the chip 22 are electrically connected with each other and combined together. The planting ball 23 has a ball high h.

A method for determining the planting ball number of the camera module will be illustrated in more details as follows.

Figure 4:
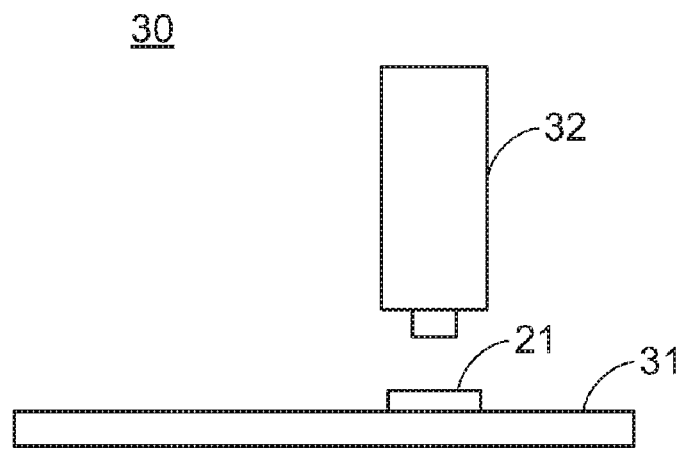
FIG. 4 schematically illustrates a machine for determining the planting ball number.

Please refer to FIG. 4, which schematically illustrates a machine for determining the planting ball number. As shown in FIG. 4, the machine 30 comprises a platform 31 and an image pickup device 32. The platform 31 is used for supporting the substrate 21. The image pickup device 32 is vertically movable relative to the platform 31 in a reciprocating manner for capturing a plurality of images of the substrate 21.

Figure 5:
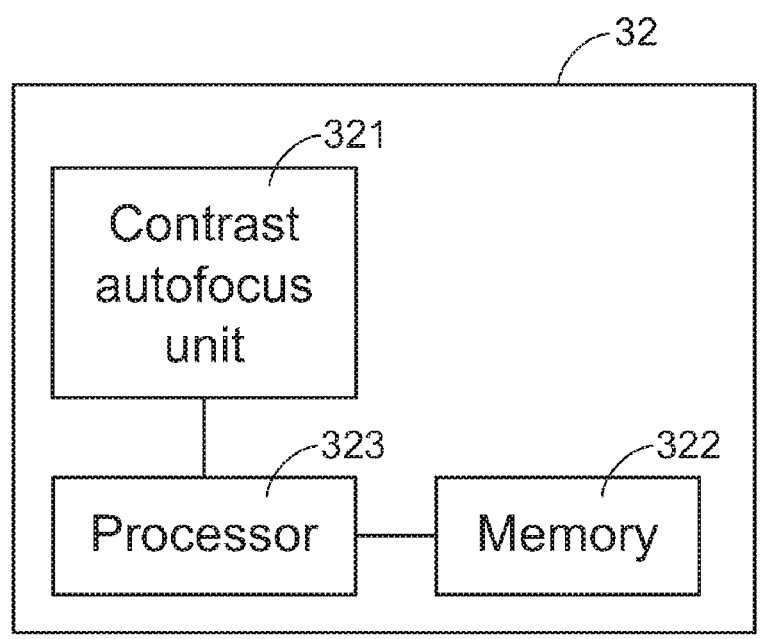
FIG. 5 schematically illustrates the image pickup device of the machine as shown in FIG. 4.

Please refer to FIG. 5, which schematically illustrates the image pickup device of the machine as shown in FIG. 4. In this embodiment, the image pickup device 32 comprises a contrast autofocus (contrast AF) unit 321, a memory 322 and a processor 323. The contrast autofocus unit 321 is used for judging the sharpness of the images, thereby achieving an auto-focusing efficacy. Moreover, the distance between the substrate and the image pickup device 32 is estimated according to the sharpest image. The various distance data are stored in the memory 322. The contrast method employed by the contrast autofocus unit 321 is a well-known auto-focusing technique, and is not redundantly described herein. The contrast method is presented herein for purpose of illustration and description only. In other words, any other auto-focusing technique (e.g. an infrared ranging method, an ultrasonic ranging method or a phase-based method) may be operated with the image pickup device 32 to achieve the auto-focusing efficacy.

Figure 6:
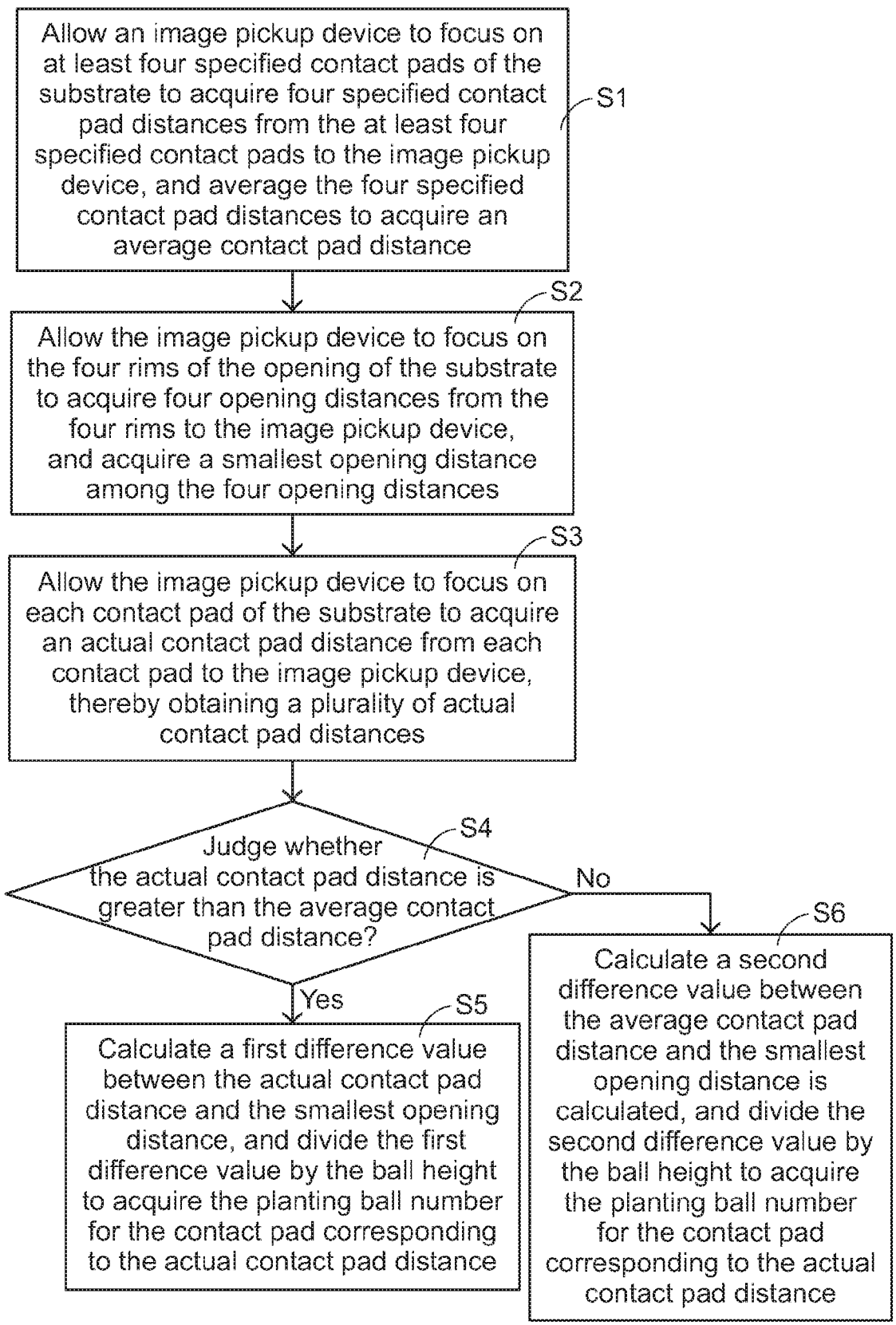
FIG. 6 is a flowchart illustrating a method for determining the planting ball number of a camera module according to an embodiment of the present invention.

FIG. 6 is a flowchart illustrating a method for determining the planting ball number of a camera module according to an embodiment of the present invention. Please refer to FIGS. 3 and 6. Firstly, the substrate 21 is placed on the machine 30. In the step S1, at least four specified contact pads are focused by the image pickup device 32. In this embodiment, the four specified contact pads $P_1$, $P_2$, $P_3$ and $P_4$ are focused by the image pickup device 32. Consequently, a first specified contact pad distance $d_1$ between the specified contact pads $P_1$ and the image pickup device 32, a second specified contact pad distance $d_2$ between the specified contact pads $P_2$ and the image pickup device 32, a third specified contact pad distance $d_3$ between the specified contact pads $P_3$ and the image pickup device 32 and a fourth specified contact pad distance $d_4$ between the specified contact pads $P_4$ and the image pickup device 32 are acquired. Then, these four specified contact pad distance $d_1$, $d_2$, $d_3$ and $d_4$ are averaged to acquire an average contact pad distance $d_p$. The average contact pad distance $d_p$ denotes the average distance from the image pickup device 32 to the contact pads $P_n$ of the substrate 21. After calculation, the average contact pad contact pad distance $d_p$ is stored in the memory 322.

In this embodiment, the four specified contact pads $P_1$, $P_2$, $P_3$ and $P_4$ are respectively located at four predetermined coordinate positions, especially beside the four corners of the substrate 21. The number of the specified contact pads is presented herein for purpose of illustration and description only. That is, the number of the specified contact pads may be varied according to the practical requirements.

Then, in the step S2, the midpoints $M_a$, $M_b$, $M_c$ and $M_d$ of the four rims 211a, 211b, 211c and 211d of the opening 211 of the substrate 21 are successively focused by the image pickup device 32. Consequently, a first opening distance $d_a$ between the midpoint $M_a$ and the image pickup device 32, a second opening distance $d_b$ between the midpoint $M_b$ and the image pickup device 32, a third opening distance $d_c$ between the midpoint $M_c$ and the image pickup device 32 and a fourth opening distance $d_d$ between the midpoint $M_d$ and the image pickup device 32 are acquired. Then, the smallest opening distance among the four opening distances $d_a$, $d_b$, $d_c$ and $d_d$ is acquired. The smallest opening distance denotes the distance from the most upturned rim of the opening 211 of the substrate 21 to the image pickup device 32. As shown in FIG. 3, the smallest opening distance is $d_m$. After calculation, the smallest opening distance $d_m$ is stored in the memory 322.

In this embodiment, the midpoints $M_a$, $M_b$, $M_b$ and $M_d$ are respectively located at four midpoint coordinate positions of the four rims 211a, 211b, 211c and 211d.

Then, as shown in the step S3, all contact pads $P_n$ of the substrate 21 are successively focused by the image pickup device 32. Consequently, an actual contact pad distance $d_n$ from each contact pad $P_n$ to the image pickup device 32 is acquired, wherein n=1~n, and n is a positive integer. Then, the actual contact pad distances $d_n$ of all contact pads $P_n$ are stored in the memory 322.

Figure 7:
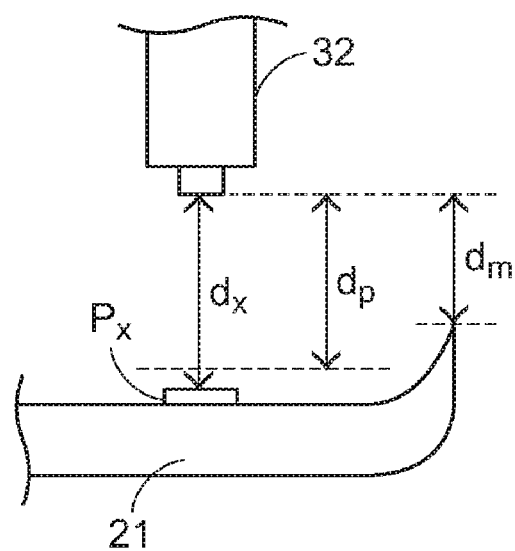
FIG. 7 schematically illustrates the distance from a contact pad $P_x$ to the image pickup device.

Then, in the step S4, the processor 323 of the image pickup device 32 successively judges whether each actual contact pad distance $d_n$ is greater than the average contact pad distance $d_p$. FIG. 7 schematically illustrates the distance from a contact pad $P_x$ to the image pickup device. If the actual contact pad distance $d_x$ of a contact pad $P_x$ of the plural contact pads $P_n$ is greater than the average contact pad distance $d_p$, it means that the distance from the contact pad $P_x$ to the image pickup device 32 is farther (see FIG. 7). That is, the contact pad $P_x$ is at a level lower than most contact pads of the substrate 21. Then, the step S5 is performed to calculate a first difference value A between the actual contact pad distance $d_x$ and the smallest opening distance $d_m$ and divide the first difference value A by the ball height h to acquire the planting ball number for the contact pad $P_x$ corresponding to the actual contact pad distance $d_x$. Since the planting ball number is sufficient to prevent the most upturned rim of the opening 211 of the substrate 21 from being contacted with the chip 22, the possibility of forming the most upturned rim as a fulcrum is minimized. As a consequence, the adhesion stability between the substrate 21 and the chip 22 is largely enhanced.

Figure 8:
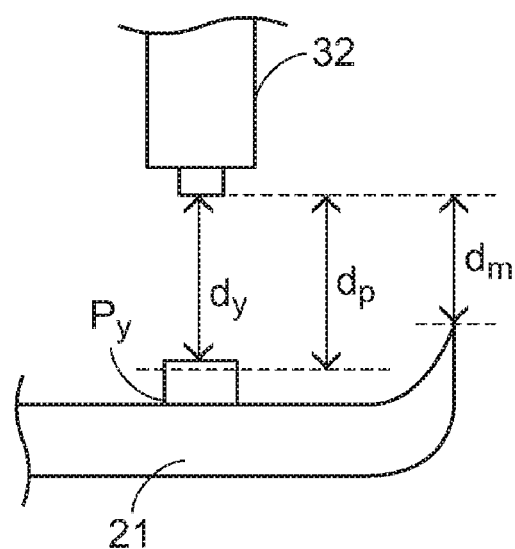
FIG. 8 schematically illustrates the distance from a contact pad $P_y$ to the image pickup device.

Please refer to the step S4 of FIG. 6 again. The processor 323 of the image pickup device 32 successively judges whether each actual contact pad distance $d_n$ is greater than the average contact pad distance $d_p$. FIG. 8 schematically illustrates the distance from a contact pad $P_y$ to the image pickup device. If the actual contact pad distance $d_y$ of another contact pad $P_y$ of the plural contact pads $P_n$ is smaller than or equal to the average contact pad distance $d_p$, it means that the distance from the contact pad $P_y$ to the image pickup device 32 is not greater than the average contact pad distance $d_p$ (see FIG. 8). Then, the step S6 is performed to calculate a second difference value B between the average contact pad distance $d_p$ and the smallest opening distance $d_m$ and divide the second difference value B by the ball height h to acquire the planting ball number for the contact pad $P_y$ corresponding to the actual contact pad distance $d_y$.

From the above description, the method of the present invention is used for determining the planting ball number of a camera module. Firstly, an image pickup device is used to detect an average contact pad distance of the distances from four specified contact pads to the image pickup device. Then, a smallest opening distance among four opening distances from the four rims to the image pickup device is acquired. Then, an actual contact pad distance from each contact pad to the image pickup device is acquired. On the basis of the average contact pad distance, the method further comprises a step of successively judging whether the actual contact pad distance is greater than the average contact pad distance. Then, the planting ball number for the contact pad corresponding to the actual contact pad distance is calculated. In such way, since the overall planting ball number is reduced, the packaging cost of the camera module is decreased. Moreover, since the heights of the contact pads of the substrate are more uniform, the possibility of resulting in skew of the chip during the chip and the substrate are laminated together will be minimized.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for determining a planting ball number of a camera module, said camera module comprising a chip and a substrate, said substrate having an opening with four rims, said chip being fixed on a plurality of contact pads of said substrate through a plurality of planting balls, each of said planting balls having a ball height, said method being configured for determining a number of planting balls on each contact pad and comprising steps of:

(A) allowing an image pickup device to focus on at least four specified contact pads of said substrate to acquire four specified contact pad distances from said at least four specified contact pads to said image pickup device, and averaging said four specified contact pad distances to acquire an average contact pad distance;

(B) allowing said image pickup device to focus on said four rims of said opening of said substrate to acquire four opening distances from said four rims to said image pickup device, and acquiring a smallest opening distance among said four opening distances;

(C) allowing said image pickup device to focus on each contact pad of said substrate to acquire an actual contact pad distance from each contact pad to said image pickup device, thereby obtaining a plurality of actual contact pad distances; and (D) successively judging whether said actual contact pad distance is greater than said average contact pad distance, wherein if said actual contact pad distance is greater than said average contact pad distance, a first difference value between said actual contact pad distance and said smallest opening distance is calculated, and said first difference value is divided by said ball height to acquire said planting ball number for said contact pad corresponding to said actual contact pad distance, wherein if said actual contact pad distance is not greater than said average contact pad distance, a second difference value between said average contact pad distance and said smallest opening distance is calculated, and said second difference value is divided by said ball height to acquire said planting ball number for said contact pad corresponding to said actual contact pad distance.

2. The method according to claim 1 wherein said at least four specified contact pads are located at four corner of said substrate, respectively.

3. The method according to claim 1 wherein said at least four specified contact pads are located at four predetermined coordinate positions, respectively.

4. The method according to claim 1 wherein in said step (B), said image pickup device focuses on respective midpoint coordinate positions of said four rims, wherein each of said midpoint coordinate position is located at a midpoint of said corresponding rim.

5. The method according to claim 1 wherein said image pickup device comprises a contrast autofocus unit.

* * * * *